United States Patent [19]

Horak

[11] 4,375,014

[45] Feb. 22, 1983

[54] CURRENT SENSING TRIGGER FOR A TELEPHONE SYSTEM

[75] Inventor: Allen C. Horak, Carson City, Mich.

[73] Assignee: Great Lakes Communication Co. of Michigan, Carson City, Mich.

[21] Appl. No.: 234,722

[22] Filed: Feb. 17, 1981

[51] Int. Cl.³ .............................................. H04Q 1/36
[52] U.S. Cl. ................................................. 179/16 EA
[58] Field of Search ........ 179/18 GC, 18 GD, 16 EA, 179/16 F, 16 E, 16 AA, 90 R

[56] References Cited

U.S. PATENT DOCUMENTS

| | | | |
|---|---|---|---|
| 3,466,404 | 9/1969 | Topfer | 179/90 R |
| 3,488,450 | 1/1970 | Davey | 179/90 R |
| 3,665,109 | 5/1972 | Shaffer | 179/16 E |
| 3,676,601 | 7/1972 | Shaffer | 179/16 E |
| 3,715,511 | 2/1973 | Shaffer | 179/16 E |
| 3,892,926 | 7/1975 | Edwards et al. | 179/16 EA |
| 4,230,912 | 10/1980 | Lee et al. | 179/16 EA |

FOREIGN PATENT DOCUMENTS 1962721  6/1971  Fed. Rep. of Germany ........ 179/16 AA
2462048  6/1976  Fed. Rep. of Germany .
2046991  3/1977  Fed. Rep. of Germany .

Primary Examiner—Thomas W. Brown
Attorney, Agent, or Firm—Price, Heneveld, Huizenga & Cooper

[57] ABSTRACT

In a loop closure seizure step-by-step telephone system, a pulsing circuit is provided comprising a current sensing trigger having first and second semiconductor barrier elements disposed in a series circuit relationship for receiving dial pulses generated by a first subscriber telephone set. The dial pulses establish a current through the first and second semiconductor barrier elements and a circuit is provided for sensing a trigger voltage established between first and second semiconductor barrier elements. A circuit is also provided for amplifying this trigger voltage and operating a stepping switch to interconnect the first subscriber telephone set and a second subscriber telephone set pursuant to a number dialed on the first subscriber telephone set.

40 Claims, 3 Drawing Figures

FIG 3

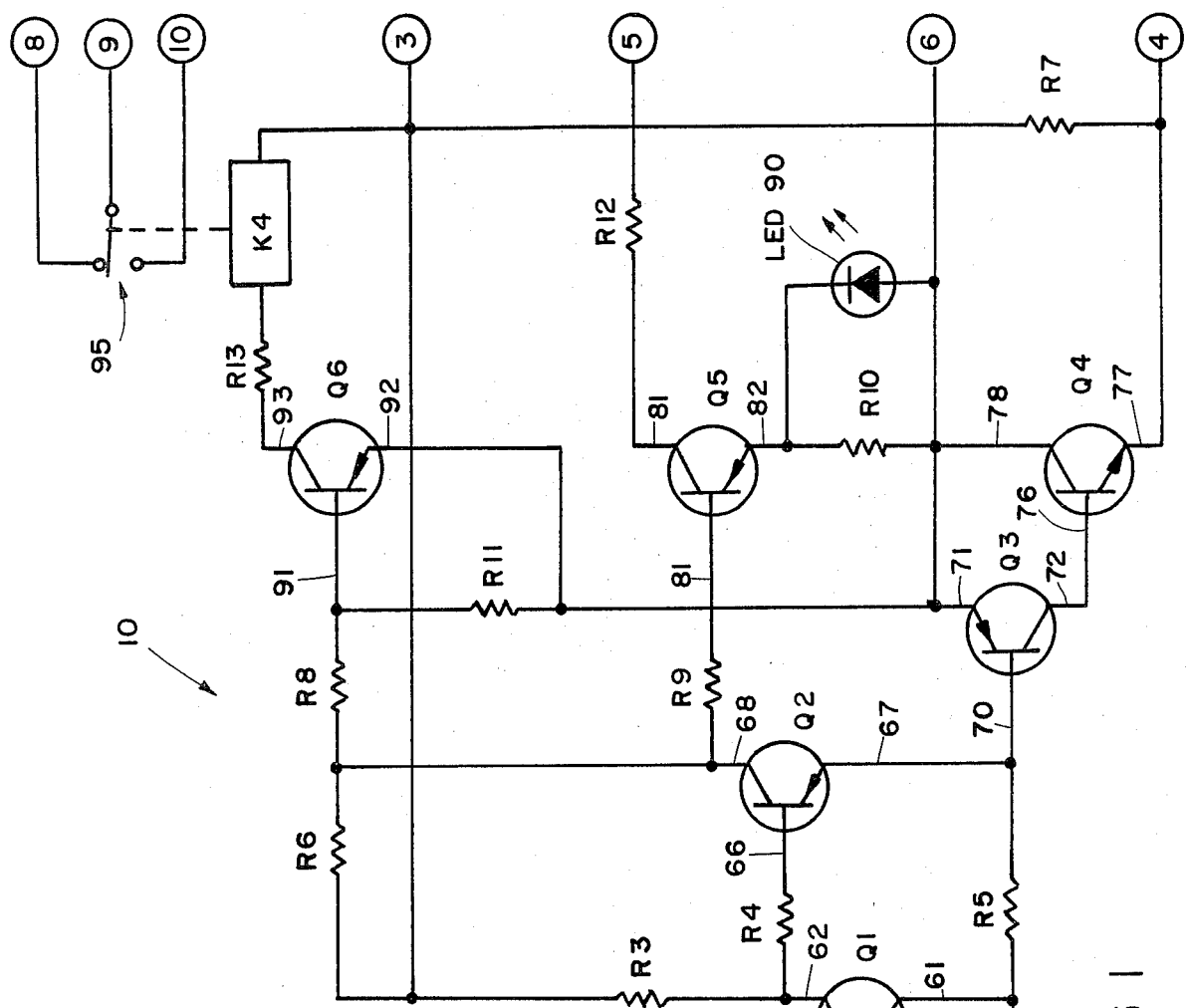
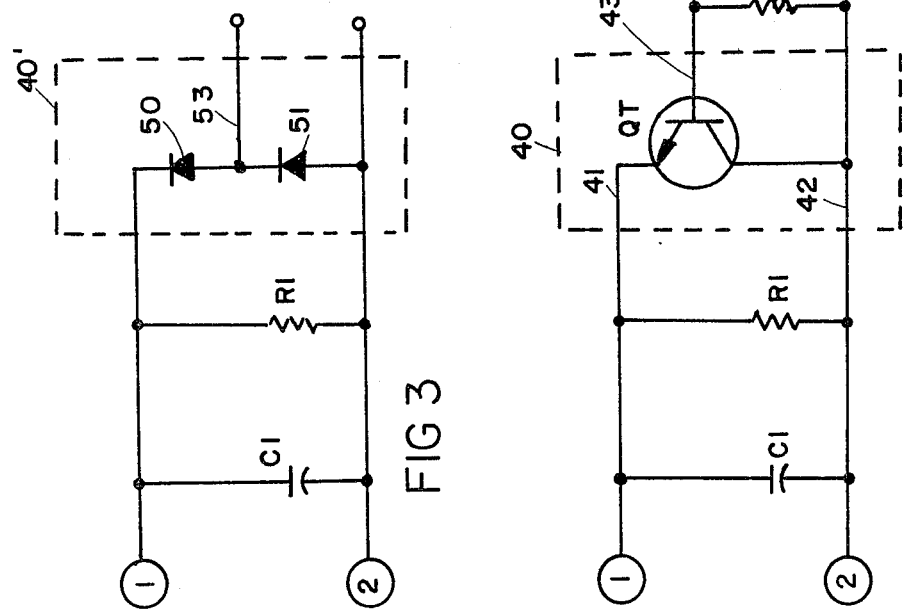
FIG 1
FIG 3

CURRENT SENSING TRIGGER FOR A TELEPHONE SYSTEM

BACKGROUND OF THE INVENTION

The invention relates generally to current sensitive trigger circuits and in particular, is directed to circuits that are responsive to telephone supervisory and control signals such as dial pulses.

In a loop closure seizure step-by-step telephone system, each subscriber telephone set is connected to a central station by tip and ring conductors. The subscriber telephone set includes a set of normally open contacts that are closed when the receiver is lifted from the telephone set. Equipment at the central station accepts this loop closure as a seizure. Thereafter dialing of the telephone set will open and close the contacts in the telephone set a predetermined number of times for each number dialed by the subscriber. This intermittent opening and closing of the loop is used to actuate a stepping switch for interconnecting a first subscriber telephone set to any one of a number of second subscriber telephone sets pursuant to the number dialed by the first subscriber.

The central station includes a selector circuit that establishes a dial tone and selects the next idle path to whatever code is dialed by the subscriber. The dial tone is generated by an AC signal impressed upon either the tip or ring side of the conductors extending to the subscriber telephone set. The selector also impresses a DC voltage across the tip and ring conductors extending to the telephone set to create dial pulses when the telephone set is dialed. The selector further includes switching or pulsing circuitry for sensing and amplifying the dial pulses to a level suitable for actuation of a stepping switch that is used to interconnect one subscriber's telephone set to another subscriber's set according to the code dialed by one of the subscribers. In the prior art these pulsing circuits normally comprise an electrical relay having a set of break/make contacts. This relay serves to alternately energize the actuating coil of the stepping switch and an enabling relay for enabling operation of the stepping switch. Two actuating coils are provided on each pulsing relay. One end of both coils extends to the subscriber's telephone set via the tip and ring conductors while the other two ends of the coils are connected to a source of DC power and ground, respectively.

The mechanical contacts of this pulsing relay deteriorate through wear, pitting and/or corroding and become a relatively high maintenance item compared to the rest of the telephone system. In recent years there has been an increased emphasis on the use of more sensitive and faster responding control devices in telephone systems to provide improved service. For example, lower inertia and faster responding pulsing relays are presently being applied to circuits for control by telephone supervisory and control signals. However, such sensitive control devices under various conditions tend to produce distorted output pulses that at times exceed acceptable limits and tend to produce undesirable spurious additional contact closures due to bounce or flutter of the pulsing relay contacts.

Furthermore, these pulsing relays are normally connected to any one of a large number of subscriber telephone lines and each telephone line presents a different set of electrical characteristics depending upon its length, gauge, leakage, the type of telephone set it is connected to, etc. Each telephone line therefore presents a different value of capacitance, inductance and resistance between the subscriber's dial and the associated selector such that the operating conditions of the selector change with each telephone line connected thereto. Furthermore, due to the high cost of copper, there is a general tendency to use smaller diameter conductors to reduce costs. Telephone lines using these smaller conductors exhibit a higher resistance per unit length and may at times exhibit higher capacitance per unit length. Thus, there is a substantial need for increasingly sensitive selector circuits which facilitate the use of longer and thinner tip and ring conductors having widely varying electrical characteristics.

SUMMARY OF THE INVENTION

These and other problems in the prior art are solved by provision of a current sensing trigger and amplifying circuit for a loop closure seizure step-by-step telephone system that eliminates the mechanical contacts heretofore associated with pulsing relays in these systems. The trigger circuit comprises first and second semiconductor barrier elements disposed in a series circuit relationship for receiving dial pulses generated by a first subscriber telephone set. The dial pulses establish a current through the first and second semiconductor barrier elements and a circuit is provided for sensing a trigger voltage thereby established between the first and second semiconductor barrier elements. A circuit is also provided for amplifying the trigger voltage and operating a stepping switch to connect a first subscriber telephone set to a second subscriber telephone set pursuant to a number dialed by the first subscriber.

In one embodiment of the invention the first and second semiconductor barrier elements are provided by a transistor trigger having a base, collector and emitter with the dial pulses applied such that the transistor is forward biased by the dial pulses and the dial pulses establish a current through the collector and emitter of the transistor trigger. In this embodiment of the invention the sensing device comprises the base of the transistor trigger. In other embodiments of the invention the first and second semiconductor barrier elements are provided first and second trigger diodes serially arranged such that the trigger diodes are forward biased by the dial pulses. In this case a lead extending between the first and second trigger diodes serves as the sensing for the trigger voltage established therebetween.

The circuit for amplifying the trigger voltage sensed between the first and second semiconductor barrier elements and operating the stepping switch simulates a set of break/make contacts which alternately apply energy to the stepping switch and a stepping switch enabling relay when dial pulses are sensed. The current sensing trigger and amplifier of the present invention eliminate the troublesome mechanical contacts normally used in prior art loop closure seizure step-by-step telephone systems. In addition to eliminating these maintenance items, the new circuit is faster and more sensitive than the mechanical relays, thus speeding service and allowing the use of longer and smaller subscriber telephone lines having varying electrical characteristics.

BRIEF DESCRIPTION OF THE DRAWINGS

FIG. 1 is a schematic of the current sensing trigger and amplifier of the present invention.

FIG. 3 is a partial schematic of an alternative embodiment of the current sensing trigger and amplifier of the present invention.

DESCRIPTION OF THE PREFERRED EMBODIMENTS

Figure 2:
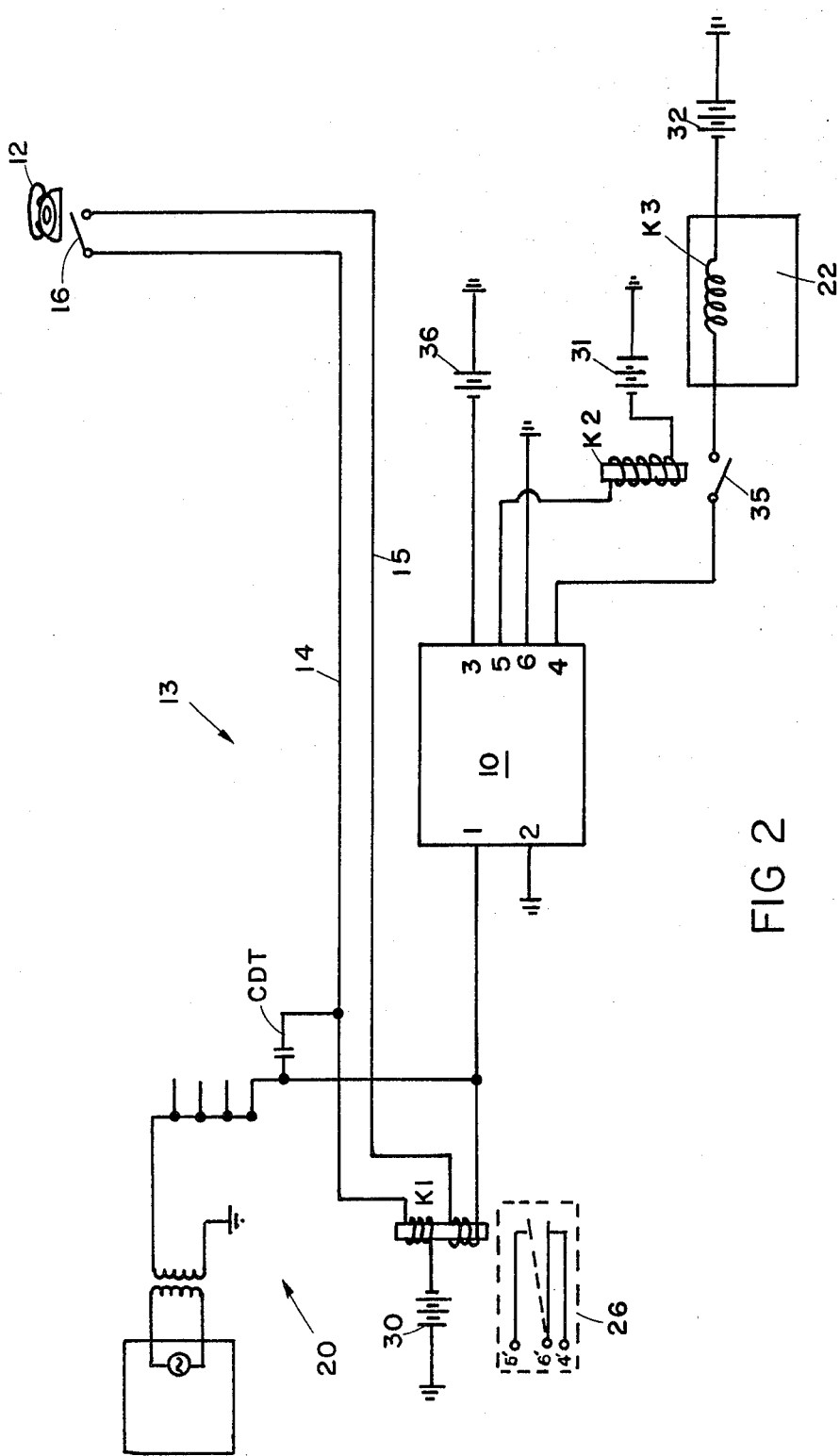
FIG. 2 is a schematic illustrating the installation of the current sensing trigger and amplifier of the present invention in a loop closure seizure telephone system.

Referring to FIGS. 1 and 2, the current sensing trigger and amplifier of the present invention is illustrated at 10. The circuit contained within the block 10 in FIG. 2 is the circuit illustrated in detail in FIG. 1. With particular reference now to FIG. 2, the current sensing trigger and amplifier 10 of the present invention is illustrated in a loop closure seizure step-by-step telephone system. The telephone system comprises a first subscriber telephone set 12 and a central switching station generally indicated by the numeral 13. The subscriber 12 is connected to the central switching station 13 by ring and tip conductors 14 and 15, respectively. In this case the first subscriber telephone set 12 is illustrated as having a switch 16 which is open and closed when the first subscriber telephone set 12 is dialed. However, it should be understood that the current sensing trigger and amplifier of the present invention is equally compatible with subscriber telephone sets having a dual-tone multi-frequency dialing system. The current sensing trigger and amplifier of the present invention neither aids or detracts from the tones.

In this case the central switching station 13 includes a dial tone generator 20, a pulsing relay K1, a stepping switch enabling relay K2, a stepping switch 22 and the current sensing trigger and amplifier 10. The circuits containing the enabling relay K1 and the actuating relay K3 of stepping switch 22 include negative power sources 31 and 32, respectively. The stepping switch 22 is connected to terminal 4 of circuit 10, the enabling relay K2 is connected to terminal 5 of circuit 10 and ground is connected to terminal 6 of circuit 10. A negative biasing potential 36 is connected to terminal 3 of circuit 10.

According to the present invention the current sensing trigger and amplifier 10 replaces the break/make contacts 26 normally actuated by the pulsing relay K1. The terminals 4, 5 and 6 of the current sensing trigger and amplifier 10 correspond to the terminals 4', 5' and 6' of the contacts 26. One end of the double-ended actuating coil of relay K1 is connected to a negative power source 30. The opposite end of the double ended actuating coil of relay K1 is connected to ground through the terminals 1 and 2 of the current sensing trigger and amplifier 10.

An alternative dial tone generator can be connected to terminal 1 of the current sensing trigger and amplifier 10. Conceivably, the dial tone generator may be disposed anywhere on the tip or ring side of the telephone system. In most prior art systems the dial tone generator is inductively coupled to the tip side of the telephone circuit between the relay K1 and ground. However, when the current sensing trigger and amplifier 10 is employed to replace the mechanical contacts 26, it is preferable to have the dial tone generator connected on the ring side of the telephone system at 20 with a coupling capacitor CDT. This isolates the dial tone generator between the telephone loop extending between the two ends of the actuating coil of switching relay K1. This loop includes the ring and tip conductors 14 and 15 and the first subscriber telephone set 12. The line resistance of the tip and ring conductors, the resistance of the telephone 12 and the large inductance of the coils of the relay K1 serve to isolate the current sensing trigger and amplifier 10 from the dial tone.

When a subscriber lifts the receiver of the first subscriber telephone set 12, the switch 16 is closed and the subscriber receives a dial tone from dial tone generator 20. This also completes a circuit including DC power source 30, the actuating coils of pulsing relay K1, and ground. In prior art systems using the mechanical break/make contacts 26, this connects terminal 6' to terminal 5', applying ground to a circuit containing the actuating coil of enabling relay K2 and negative power source 31. Actuation of enabling relay K2 closes switch 35 in the circuit containing the stepping switch 22 and power source 32. When the first subscriber telephone set 12 is dialed, the switch 16 opens and closes a predetermined number of times for each number dialed on the telephone set. Each time the switch 16 opens, the mechanical contacts 26 of pulsing relay K1 reconnect terminal 6' to terminal 4', applying ground to the circuit containing the switch 35, the stepping switch 22 and power source 32. Although this action simultaneously disconnects the actuating coil of enabling relay K2, the enabling relay K2 is deliberately provided with a large inductance such that it is a slow acting relay. Thus, the switch 35 does not immediately open and ground is thus briefly applied to the circuit containing actuating relay K3 of stepping switch 22. This applies a pulse of power to stepping switch 22 for incrementing the same and connecting the first subscriber telephone set 12 to a second subscriber telephone set, not illustrated herein, according to the number dialed by the first subscriber.

the operation of the telephone system employing the current sensing trigger and amplifier 10 of the present invention is similar, except that the terminals 4', 6' and 5' of the mechanical contacts 26 are disconnected and the circuits containing the stepping switch, the enabling relay and ground are connected to the terminals 4, 5 and 6, respectively, of the current sensing trigger and amplifier 10. The circuit 10 automatically senses the dial pulses generated by the telephone set 12 and alternately applies ground to terminals 4 and 5 to increment the stepping switch 22.

With particular reference now to FIG. 1, the current sensing trigger and amplifying circuit 10 of the present invention comprises a trigger circuit encompassed within the box 40. The trigger circuit 40 comprises first and second semiconductor barrier elements disposed in a series circuit relationship for receiving the dial pulses applied to terminals 1 and 2. In the embodiment of the invention illustrated in FIG. 1, the first and second semiconductor barrier elements comprise the emitter and collector junctions of an NPN transistor QT that is forward biased by the dial pulses applied to terminals 1 and 2. The sensing means for sensing a trigger voltage generated between the first and second semiconductor barrier elements by the dial pulses in this case comprises the base 43 of transistor trigger QT.

In the embodiment of the invention illustrated in FIG. 3, an alternative trigger 40' is provided comprising first and second trigger diodes 50 and 51. The first and second trigger diodes 50 and 51 are disposed in a series relationship such that both of the trigger diodes are forward biased by the dial pulses applied to terminals 1 and 2. In this case, the means for sensing the trigger voltage established between the first and second semiconductor barrier elements comprises a lead 53 connected to a junction disposed between the first and second semiconductor barrier elements 50 and 51.

The remainder of the circuit illustrated in FIG. 1 to the right of the trigger 40 comprises the means for amplifying the trigger voltage and operating the stepping switch. The capacitance C1 connected across the terminals 1 and 2 to the left of the trigger 40 is provided for isolating the trigger 40 from the dial tone generator 20. The resistance R1 connected across the terminals 1 and 2 to the left of the trigger 40 is provided to desensitize the trigger and prevent the generation of spurious trigger signals when noise is present. The output of the triggers 40 or 40' on lines 43 or 53, respectively, is approximately (−)0.6 volts when the dial pulses establish a current through the first and second semiconductor barrier devices of the trigger. The resistance and sensitivity of the trigger is quite low and thus the trigger means generates a trigger voltage of approximately (−)0.6 volts at much lower current levels than that required to operate the switching relay K1. Thus, in addition to eliminating the troublesome mechanical contacts of relay K1, the trigger 40 allows the use of longer and thinner subscriber telephone lines. Furthermore, the speed at which the trigger 40 and the amplifier switch is considerably greater than that possible with a conventional relay having a relatively large inductance and mechanical contacts.

In preferred embodiments, the means for amplifying the trigger voltage and operating the stepping switch comprises a forward biased PNP first amplifier transistor Q1 having a base 60 and emitter 61 and a collector 62. The base 60 of the transistor Q1 is connected to the base 43 of sensing means 40 or the lead 53 of sensing means 40' such that the first amplifer transistor Q1 is switched on when a trigger voltage is present. Biasing voltages for the amplifier transistors is provided by negative potentials 36, 31 and 32, illustrated in FIG. 2, connected to terminals 3, 5 and 4, respectively, of the circuit 10.

A forward biased PNP second amplifier transistor Q2, having a base 66, an emitter 67, and a collector 68, has its base 66 and emitter 67 connected to the collector 62 and emitter 61 of the first amplifier transistor Q1 such that the second amplifier transistor Q2 is switched off when a trigger voltage is present. A forward biased PNP third amplifier transistor Q3 is provided having a base 70, an emitter 71 and a collector 72. The base of the third amplifier transistor Q3 is connected to the emitter of the second amplifier transistor Q2 for switching the third amplifier transistor off when a trigger voltage is present.

The amplifier further includes a normally closed first switching means comprising a forward biased NPN fourth amplifier transistor Q4 having a base 76, an emitter 77 and a collector 78. The base 76 of the fourth amplifier transistor Q4 is connected to the collector 72 of the third amplifier transistor Q3 for switching the fourth amplifier transistor Q4 off when a trigger voltage is sensed. The collector 78 of fourth amplifier transistor Q4 is connected to terminal 6 of the trigger sensing and amplifier circuit 10 which is in turn connected to ground. The emitter 77 of fourth amplifier transistor Q4 is connected to terminal four of the current sensing trigger and amplifying circuit 10 which includes a circuit containing the enabling switch 35, the actuating coil K3 of the stepping switch 22 and the power source 32, illustrated in FIG. 2.

The amplifier further comprises a normally open second switching means comprising a forward biased NPN fifth amplifier transistor Q5 having a base 80, a collector 81, and an emitter 82. The base 81 of the fifth amplifier transistor Q5 is connected to the collector 68 of the second amplifier transistor Q2 for switching the fifth amplifier transistor Q5 on when a trigger voltage is present. The emitter 82 of the fifth amplifier transistor Q5 is connected to ground at terminal 6. The collector 81 of fifth amplifier transistor Q5 is connected to terminal 5 which includes the actuating coil of enabling relay K2 and the power source 31, best illustrated in FIG. 2. Thus, when a trigger voltage is sensed, fourth amplifier transistor Q4 is switched off and fifth amplifier transistor Q5 is switched on. This applies ground on terminal 6 to terminal 5, completing a circuit including the actuating coil of the enabling relay K2 and the power source 31. This closes the enabling switch 35 disposed in the circuit containing the actuating coil K3 of stepping switch 22 and the power source 32. When the trigger voltage is not present, such as when the loop is broken by dialing at the first subscriber telephone set 12, the fourth amplifier transistor Q4 is switched on and the fifth amplifier transistor Q5 is switched off, such that ground is removed from terminal 5 and is applied to terminal 4 through fourth amplifier transistor Q4. This completes a circuit including the switch 35, the actuating coil K3 of stepping switch 22 and the power source 32. Since the actuating coil K2 is a slow acting coil, the enabling switch 35 remains closed for a predetermined time period during which ground is applied to terminal 4. This completes the circuit through the actuating relay coil K3 of the stepping switch 22 for a time sufficient to increment the stepping switch 22. The stepping switch 22 is thereby incremented by each dial pulse generated by the first subscriber telephone set 12.

A light emitting diode 90 is disposed across resistor R10 between the emitter 82 of fifth amplifier transistor Q5 and the terminal 6 to indicate when the enabling relay K2 is actuated and a trigger voltage is present.

In some embodiments of the invention, a normally open third switching means may be provided comprising a forward biased PNP sixth amplifier transistor Q6 having a base 91, an emitter 92 and a collector 93. The base 91 of the sixth amplifier transistor Q6 is connected to the collector 71 of the third amplifier transistor Q3 such that the sixth amplifier transistor Q6 is switched on along with the fifth amplifier transistor Q5 when a trigger voltage is present. The emitter 92 of the sixth amplifier transistor Q6 is connected to ground on terminal 6 and the collector 93 of the sixth amplifier transistor Q6 is connected to a negative power source on terminal 3 through the actuating coil of fourth relay K4. The fourth relay K4 includes a set of break/make contacts 95 that are connected to terminals 8, 9 and 10. In this manner, additional relays may be operated by adding one or more additional amplifier transistors such as the sixth amplifier transistor Q6 to provide as many switched ground sources as necessary.

A complete parts list for the schematic illustrated in FIG. 1 is presented below:

| NUMBER | VALUE OF THE COMPONENT |
|---|---|
| C1 | .22 MF 50 VDC |
| R1 | 100 Ohms |
| R2 | 10K Ohms |
| R3 | 220K Ohms |

| NUMBER | VALUE OF THE COMPONENT |
| --- | --- |
| R4 | 22K Ohms |
| R5 | 5.6K Ohms |
| R6 | 5.6K Ohms |
| R7 | 1 Meg Ohm |
| R8 | 22K Ohms |
| R9 | 22K Ohms |
| R10 | 47 Ohms |
| R11 | 4.7K Ohms |
| R12 | 100 Ohms ½ watt |
| R13 | 1.5K Ohms ½ watt |
| QT | TIP31 |
| Q1 | 2N4403 |
| Q2 | 2N4403 |
| Q3 | TIP30 |
| Q4 | TIP31 |
| Q5 | TIP30 |
| Q6 | 2N4403 |
| LED90 | CRITIP220 |
| CDT | .22 MF 250 VDC |

Unless otherwise specified, all resistances are rated ¼ watt.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. A loop closure seizure step-by-step telephone system comprising:
   a first subscriber telephone set;
   a central switching station;
   means for interconnecting said first subscriber telephone set and said central switching station;
   a stepping switch for connecting said first subscriber telephone set to a second subscriber telephone set;
   means for generating dial pulses representative of a number being dialed on said first subscriber telephone set;
   first and second semiconductor barrier means disposed in a series circuit relationship for receiving said dial pulses, said dial pulses establishing current therethrough;
   means for sensing a trigger voltage between said first and second semiconductor barrier means when a current is established therethrough; and
   means for amplifying said trigger voltage and operating said stepping switch to connect said first subscriber telephone set and a second subscriber telephone set pursuant to a number dialed on said first subscriber telephone set.

2. The telephone system of claim 1 wherein said first and second semiconductor barrier means comprise a transistor trigger having a base, a collector and an emitter, said dial pulses being applied such that a current is established through said collector and said emitter of said transistor trigger.

3. The telephone system of claim 2 wherein said transistor trigger comprises an NPN transistor that is forward biased by said dial pulses.

4. The telephone system of claim 3 wherein said means for sensing a trigger voltage comprises said base of said transistor trigger.

5. The telephone system of claim 1 wherein said first and second semiconductor barrier means are first and second trigger diodes.

6. The telephone system of claim 5 wherein said first and second trigger diodes and said means for generating dial pulses are connected such that said first and second trigger diodes are forward biased by said dial pulses.

7. The telephone system of claim 1 wherein said means for amplifying said trigger voltage and operating said stepping switch comprises:
   a normally closed first switching means for applying power to said stepping switch; and
   a normally open second switching means for isolating an enabling relay, for enabling operation of said stepping switch.

8. The telephone system of claim 7 wherein said means for amplifying said trigger voltage and operating said stepping switch further comprises means for opening said first switching means and closing said second switching means, when a trigger voltage is sensed, to isolate said stepping switch and apply power to said enabling relay, respectively.

9. The telephone system of claim 8 wherein said normally closed first switching means and said normally open second switching means are both connected to ground for alternately connecting ground to electrical circuits containing said stepping switch and said enabling relay, respectively, whereby a set of break/make contacts are simulated.

10. The telephone system of claim 8 wherein said means for amplifying said trigger voltage and operating said stepping switch further comprises a normally open third switching means for isolating a second relay, said means for opening said first switching means and closing said second switching means further comprising means for closing said third switching means when a trigger voltage is sensed.

11. The telephone sytem of claim 1 wherein said means for amplifying said trigger voltage and operating said stepping switch comprises a forward biased PNP first amplifier transistor having a base, emitter and collector, said base of said first transistor being connected to said means for sensing a trigger voltage such that said first transistor is switched on when a trigger voltage is sensed.

12. The telephone system of claim 11 wherein said means for amplifying said trigger voltage and operating said stepping switch further comprises a forward biased PNP second amplifier transistor having a base, emitter and collector, said base and said emitter of said second transistor being connected to said collector and said emitter of said first transistor for switching said second transistor off when a trigger voltage is sensed.

13. The telephone system of claim 12 wherein said means for amplifying said trigger voltage and operating said stepping switch further comprises a forward biased PNP third amplifier transistor having a base, emitter and collector, said base of said third transistor being connected to said emitter of said second transistor for switching said third transistor off when a trigger voltage is sensed.

14. The telephone system of claim 13 wherein said means for amplifying said trigger voltage and operating said stepping switch further comprises:
   a normally closed first switching means for applying power to said stepping switch; and a normally open second switching means for isolating an enabling relay, for enabling operation of said stepping switch.

15. The telephone system of claim 14 wherein said first, second and third amplifier transistors comprise means for opening said first switching means and closing said second switching means, when a trigger voltage is sensed, to isolate said stepping switch and apply power to said enabling relay, respectively.

16. The telephone system of claim 15 wherein said normally closed first switching means and said normally open second switching means are both connected to ground for alternately connecting ground to electrical circuits containing said stepping switch and said enabling relay, respectively, whereby a set of break/make contacts are simulated.

17. The telephone system of claim 16 wherein said normally closed first switching means comprises a forward biased NPN fourth amplifier transistor having a base, emitter and collector, said base of said fourth transistor being connected to said collector of said third transistor for switching said fourth transistor off when a trigger voltage is sensed.

18. The telephone system of claim 17 wherein said normally open second switching means comprises a forward biased PNP fifth amplifier transistor having a base, emitter and collector, said base of said fifth transistor being connected to said collector of said second transistor for switching said fifth transistor on when a trigger voltage is sensed.

19. The telephone system of claim 18 wherein said means for amplifying said trigger voltage and operating said stepping switch further comprises a normally open third switching means for isolating a second relay, said first, second and third amplifier transistors comprising means for closing said third switching means when a trigger voltage is sensed.

20. The telephone system of claim 19 wherein said normally open third switching means comprises a forward biased PNP sixth amplifier transistor having a base, emitter and collector, said base of said sixth transistor being connected to said collector of said third transistor for switching said sixth transistor on when a trigger voltage is sensed.

21. A current sensing trigger and amplifier for sensing the dial pulses from a first subscriber in a step-by-step telephone system comprising:
first and second semiconductor barrier means disposed in a series circuit relationship for receiving said dial pulses, said dial pulses establishing current therethrough;
means for sensing a trigger voltage between said first and second semiconductor barrier means; and
means for amplifying said trigger voltage and operating a stepping switch to connect said first subscriber to a second subscriber.

22. The current sensing trigger and amplifier of claim 21 wherein said first and second semiconductor barrier means comprise a transistor trigger having a base, a collector and an emitter, said dial pulses being applied such that a current is established through said collector and said emitter of said transistor trigger.

23. The current sensing trigger and amplifier of claim 22 wherein said transistor trigger comprises an NPN transistor that is forward biased by said dial pulses.

24. The current sensing trigger and amplifier of claim 23 wherein said means for sensing a trigger voltage comprises said base of said transistor trigger.

25. The current sensing trigger and amplifier of claim 21 wherein said first and second semiconductor barrier means are first and second trigger diodes.

26. The current sensing trigger of claim 25 wherein said first and second trigger diodes and said means for generating dial pulses are connected such that said first and second trigger diodes are forward biased by said dial pulses.

27. The current sensing trigger and amplifier of claim 21 wherein said means for amplifying said trigger voltage and operating said stepping switch comprises:
a normally closed first switching means for applying power to said stepping switch; and
a normally open second switching means for isolating an enabling relay, for enabling operation of said stepping switch.

28. The current sensing trigger and amplifier of claim 27 wherein said means for amplifying said trigger voltage and operating said stepping switch further comprises means for opening said first switching means and closing said second switching means, when a trigger voltage is sensed, to isolate said stepping switch and apply power to said enabling relay, respectively.

29. The current sensing trigger and amplifier of claim 28 wherein said normally closed first switching means and said normally open second switching means are both connected to ground for alternately connecting ground to electrical circuits containing said stepping switch and said enabling relay, respectively, whereby a set of break/make contacts are simulated.

30. The current sensing trigger and amplifier of claim 27 wherein said means for amplifying said trigger voltage and operating said stepping switch further comprises a normally open third switching means for isolating a second relay, said means for opening said first switching means and closing said second switching means further comprising means for closing said third switching means when a trigger voltage is sensed.

31. The current sensing trigger and amplifier of claim 21 wherein said means for amplifying said trigger voltage and operating said stepping switch comprises a forward biased PNP first amplifier transistor having a base, emitter and collector, said base of said first transistor being connected to said means for sensing a trigger voltage such that said first transistor is switched on when a trigger voltage is sensed.

32. The current sensing trigger and amplifier of claim 31 wherein said means for amplifying said trigger voltage and operating said stepping switch further comprises a forward biased PNP second amplifier transistor having a base, emitter and collector, said base and said emitter of said second transistor being connected to said collector and said emitter of said first transistor for switching said second transistor off when a trigger voltage is sensed.

33. The current sensing trigger and amplifier of claim 32 wherein said means for amplifying said trigger voltage and operating said stepping switch further comprises a forward biased PNP third amplifier transistor having a base, emitter and collector, said base of said third transistor being connected to said emitter of said second transistor for switching said third transistor off when a trigger voltage is sensed.

34. The current sensing trigger and amplifier of claim 33 wherein said means for amplifying said trigger voltage and operating said stepping switch further comprises:

a normally closed first switching means for applying power to said stepping switch; and a normally open second switching means for isolating an enabling relay, for enabling operation of said stepping switch.

35. The current sensing trigger and amplifier of claim 34 wherein said first, second and third amplifier transistors comprise means for opening said first switching means and closing said second switching means, when a trigger voltage is sensed, to isolate said stepping switch and apply power to said enabling relay, respectively.

36. The current sensing trigger and amplifier of claim 35 wherein said normally closed first switching means and said normally open second switching means are both connected to ground for alternately connecting ground to electrical circuits containing said stepping switch and said enabling relay, respectively, whereby a set of break/make contacts are simulated.

37. The current sensing trigger and amplifier of claim 36 wherein said normally closed first switching means comprises a forward biased NPN fourth amplifier transistor having a base, emitter and collector, said base of said fourth transistor being connected to said collector of said third transistor for switching said fourth transistor off when a trigger voltage is sensed.

38. The current sensing trigger and amplifier of claim 37 wherein said normally open second switching means comprises a forward biased PNP fifth amplifier transistor having a base, emitter and collector, said base of said fifth transistor being connected to said collector of said second transistor for switching said fifth transistor on when a trigger voltage is sensed.

39. The current sensing trigger and amplifier of claim 38 wherein said means for amplifying said trigger voltage and operating said stepping switch further comprises a normally open third switching means for isolating a second relay, said first, second and third amplifier transistors comprising means for closing said third switching means when a trigger voltage is sensed.

40. The current sensing trigger and amplifier of claim 39 wherein said normally open third switching means comprises a forward biased PNP sixth amplifier transistor having a base, emitter and collector, said base of said sixth transistor being connected to said collector of said third transistor for switching said sixth transistor on when a trigger voltage is sensed.

* * * * *